United States Patent
Thackray et al.

(10) Patent No.: US 9,992,263 B2
(45) Date of Patent: Jun. 5, 2018

(54) PREDICTIVE PRIORITIZED SERVER PUSH OF RESOURCES

(71) Applicant: Pulse Secure, LLC, San Jose, CA (US)

(72) Inventors: Jonathan Richard Mark Thackray, Cambridge (GB); Shane M. Kearns, Cambridge (GB); Andrew D. Knox, Cambridge (GB); Julian T. J. Midgley, Waterbeach (GB)

(73) Assignee: Pulse Secure, LLC, San Jose, CA (US)

( * ) Notice: Subject to any disclaimer, the term of this patent is extended or adjusted under 35 U.S.C. 154(b) by 57 days.

(21) Appl. No.: 14/511,983

(22) Filed: Oct. 10, 2014

(65) Prior Publication Data
US 2016/0105374 A1    Apr. 14, 2016

(51) Int. Cl.
*G06F 15/173*    (2006.01)
*H04L 29/08*    (2006.01)

(52) U.S. Cl.
CPC ............. *H04L 67/06* (2013.01); *H04L 67/02* (2013.01); *H04L 67/2819* (2013.01); *H04L 67/2847* (2013.01)

(58) Field of Classification Search
None
See application file for complete search history.

(56) References Cited

U.S. PATENT DOCUMENTS

| | | | | |
|---|---|---|---|---|
| 7,721,294 B2 * | 5/2010 | Quinet | ..................... | H04L 29/06 709/217 |
| 8,224,964 B1 * | 7/2012 | Fredrickson | ...... | H04L 29/08729 709/227 |
| 9,307,004 B1 * | 4/2016 | Hayden | ............... | H04L 67/2838 |
| 9,419,926 B2 * | 8/2016 | Trossen | .................. | H04W 4/12 |
| 2002/0133570 A1 * | 9/2002 | Michel | .............. | G06F 17/30902 709/219 |
| 2009/0013034 A1 * | 1/2009 | Cheng | ..................... | H04L 67/02 709/203 |
| 2009/0138956 A1 * | 5/2009 | Schneider | ............. | H04L 67/327 726/12 |
| 2013/0097280 A1 * | 4/2013 | Aaltonen | ........... | G06Q 30/0601 709/217 |
| 2013/0226992 A1 * | 8/2013 | Bapst | ................ | G06F 17/30902 709/203 |
| 2013/0326022 A1 * | 12/2013 | Ehrlich | ............. | G06F 17/30902 709/219 |
| 2014/0053064 A1 * | 2/2014 | Weber | .................. | G06F 17/2247 715/235 |
| 2014/0359070 A1 * | 12/2014 | Sundaram | ............... | H04L 67/02 709/219 |
| 2015/0135253 A1 * | 5/2015 | Angel | ................. | H04L 63/0227 726/1 |
| 2015/0161284 A1 * | 6/2015 | Mineki | .............. | H04N 21/4126 709/213 |
| 2015/0327068 A1 * | 11/2015 | Hunt | ..................... | H04W 12/08 726/4 |

* cited by examiner

*Primary Examiner* — Joshua Joo
(74) *Attorney, Agent, or Firm* — Park, Vaughan, Fleming & Dowler LLP; Laxman Sahasrabuddhe

(57) ABSTRACT

Systems and techniques for improving network performance are described. In some embodiments, an intermediary device can intercept a response from a server to a client, wherein the response corresponds to a request for a document. Next, the intermediary device can assign priorities to a plurality of resources in the document. The intermediary device can then push the plurality of resources in the document to the client in accordance with the assigned priorities.

13 Claims, 3 Drawing Sheets

PREDICTIVE PRIORITIZED SERVER PUSH OF RESOURCES

BACKGROUND

Field

The present disclosure relates to data networking in general and to optimizing network traffic in particular.

Related Art

Data communications networks, such as local area networks (LANs) and wide area networks (WANs) often include a variety of network devices for sending, receiving, directing, and optimizing network data traffic. A network optimization device is a type of network device that can improve network performance in reading and/or writing data over a network.

Network optimization devices are referred to in the art by many different terms, and techniques for optimizing network traffic to improve network performance in reading and/or writing data over a network are referred to in the art by many different terms. In this disclosure, the term "network optimization device" is used to refer to such devices and applications and "network optimization" is used to refer to such techniques.

SUMMARY

Some embodiments described herein substantially reduce the latency for loading documents, e.g., pages on websites. Specifically, an intermediary device can intercept a response from a server to a client, wherein the response corresponds to a request for a document. In some embodiments, the client is a web client (e.g., a web browser), the server is a web server, the document is a page on a website, the request is a Hypertext Transfer Protocol (HTTP) request, and the response is an HTTP response. The intermediary device can parse the intercepted response (e.g., by parsing HyperText Markup Language (HTML) source code of the document, e.g., a page on a website, that is included in the response) to determine relationship metadata that specifies how a plurality of resources in the document relate to each other.

Next, the intermediary device can assign priorities to the plurality of resources in the document. For example, the intermediary device can assign a priority to each resource based on a type of the resource. As another example, the intermediary device can store an order in which one or more clients request the plurality of resources in the document, and then assign priorities to the plurality of resources based on the stored order. In yet another example, the intermediary can collect data about the order in which the plurality of resources in the document are requested by one or more clients over a plurality of requests. Next, the intermediary can perform statistical analysis of the collected data (e.g., the intermediary can determine the most frequent order in which the plurality of resources are requested), and then assign priorities to the plurality of resources based on the statistical analysis. Note that at least some of the plurality of resources may be stored in a local cache at the intermediary device (if a particular resource is not stored in the local cache, then the intermediary can retrieve the resource from the server). In some embodiments, the intermediary can assign priorities to the resources based on a type of the client. Specifically, in some embodiments, the intermediary can collect data about the order in which the plurality of resources in the document are requested by one or more clients over a plurality of requests, and also collect data about the type of client that requested the document. Next, the intermediary can perform statistical analysis of the collected data (e.g., the intermediary can determine the most frequent order in which the plurality of resources are requested by a particular type of client), and then assign priorities to the plurality of resources based on the statistical analysis. Note that the same resource may be assigned different priorities depending on the type of client.

The intermediary device can then push the plurality of resources in the document to the client in accordance with the assigned priorities. In some embodiments, pushing a resource to a client can involve sending the resource to the client without first receiving an explicit request for the resource from the client. The pushed resources can then be stored on the local cache of the client, and can be provided to an application (e.g., a web browser) upon request, thereby substantially reducing the latency for the application to obtain the resource.

DETAILED DESCRIPTION

Figure 1:
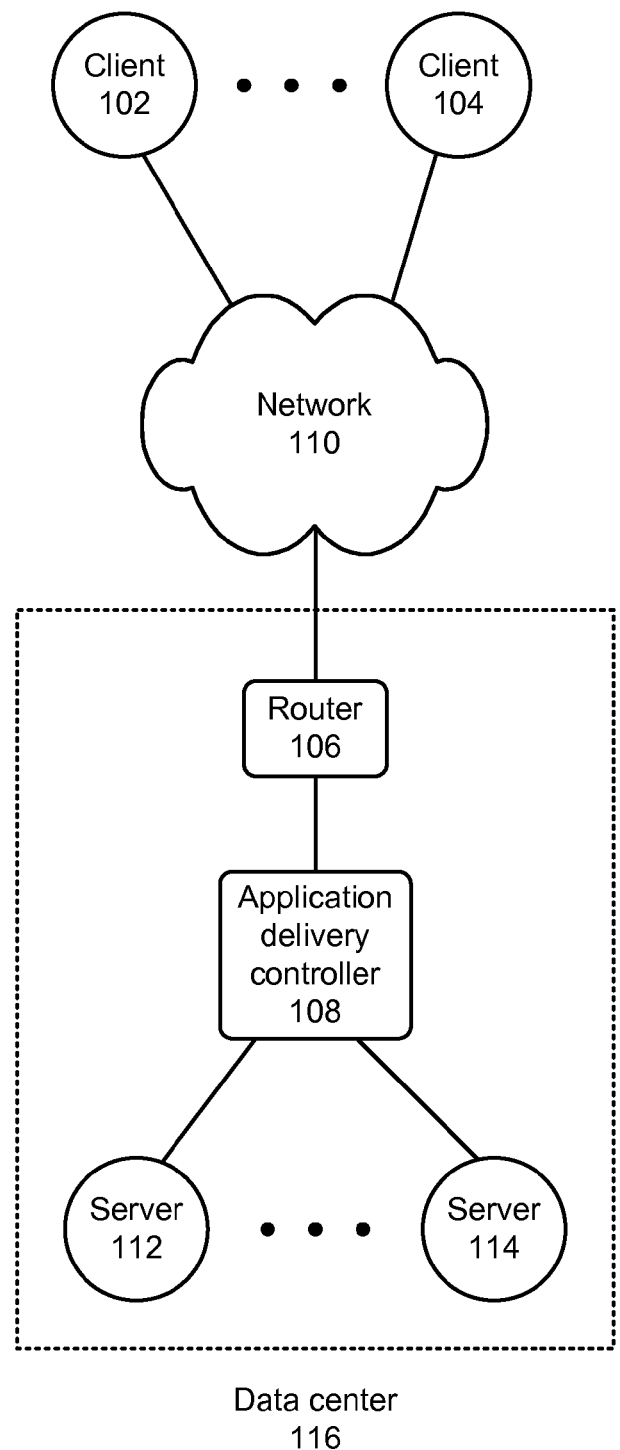
FIG. 1 illustrates an example of how an application delivery controller can improve network performance in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism (e.g., processing circuitry) that is capable of executing instructions stored on a storage medium (e.g., random access memory). Examples of computers include, but are not limited to, handheld computers, laptop computers, desktop computers, distributed computers, printers, appliances, and other apparatuses that include hardware (and optionally software) for performing computations.

According to one definition, a network is an interconnection of one or more devices that is capable of delivering information from one computer to another computer. Examples of networks include, but are not limited to, wireless and wired networks, LANs, MANs, WANs, private networks, public networks, intranets, internets, etc.

Overview

Although some embodiments in the following paragraphs have been described in the context of web technologies, it will be evident to a person having ordinary skill in the art that the systems and techniques described herein can generally be applied to any client server system.

Latency is a major factor that determines the speed of loading pages on websites using the HTTP/1.1 protocol. In fact, some studies have shown that latency is more important to improve the end user experience than overall bandwidth. Specifically, experiments have shown that the page load time (i.e., the time it takes for a webpage to load after the browser requests the webpage) decreases proportionately with latency. Increasing the bandwidth also decreases latency, but has diminishing returns (i.e., the decrease in page load time per unit increase in bandwidth continues to decrease). Therefore, to decrease page load time, decreasing the latency can be more effective than increasing the bandwidth.

Some embodiments described herein decrease the page load time when using a browser that supports the SPDY protocol (SPDY is pronounced speedy and is an open networking protocol for transporting web content) or the HTTP/2.0 protocol, both of which support a "server push" feature. The "server push" feature allows the server (or in embodiments described herein, allow an intermediary device that is located between the client and the server) to send content to the client without first explicitly receiving a request from the client for the aforementioned content. In other words, the "server push" feature can reduce latency because the feature allows the web server or an intermediary device to push webpage content without the client requesting it, thereby avoiding the latency of the round-trip time (RTT) required for the client to send a request to the server and for the server to respond with the requested content.

Some embodiments extend the capabilities of an intermediary device (e.g., a network optimization device that is currently performing web caching and possibly other optimizations) to additionally perform the following operations: (1) parse HTML documents as they transit from origin webservers to clients, (2) determine the website resources referenced from the HTML, (3) assign priorities to each resource, (4) store this relationship metadata, and the resources in the cache of the intermediary device, (5) listen for subsequent requests, and when one is received, initiate a "server push" for the associated content based on the assigned priorities.

Note that some webpage content may be more important than others. For example, typically Cascading Style Sheets (CSS) must be loaded first, since the CSSOM (CSS Object Model) must be constructed before a web page can be rendered. By sending the HTML and CSS first, the user-perception of the speed of website can be improved significantly as the web page can begin rendering more quickly as it is not blocked waiting for key resources to be transferred over the network.

One example of how some embodiments described herein can reduce latency is as follows. Suppose a web browser client makes a SPDY or HTTP/2.0 request for a website, which is served by the server through an intermediary device which is located between the client and the server. The intermediary device can parse the website's HTML source code and learn which resources (images, JavaScript, CSS, etc.) are associated with the document content. Next, the intermediary device can assign priorities to the resources (i.e., the resources that were discovered by parsing the website's HTML) according to a set of rules, which can be automatically generated based on statistical analysis and/or can be pre-defined by a user. The priorities and relationship metadata (which is obtained by parsing the website's HTML and specifies how different resources are related to each other) and the website content can be stored in the intermediary device's cache as content is requested by the user's browser, and as the content transits through the intermediary device. When a subsequent SPDY or HTTP/2.0 request is made for the same website (either by the same client or by a different client), the intermediary device can initiate a "server push" of the associated resources in accordance with the assigned priorities, i.e., the resources that have the highest priority can be pushed first and the resources that have the lowest priority can be pushed last.

Embodiments described herein have many advantages over conventional techniques including, but not limited to, (1) ability to automatically infer priorities for associated content, and (2) ability to reduce latency, thereby reducing the user's perception of the page load time. Some embodiments described herein automatically prioritize sending content that, until received, will cause a browser to be blocked rendering a page.

Example of a Network

FIG. 1 illustrates an example of how an application delivery controller can improve network performance in accordance with some embodiments described herein. Although some of the examples described in this disclosure are in the context of a specific network configuration, the disclosed systems and techniques can generally be used to improve performance of any type of network configuration.

In the example illustrated in FIG. 1, data center 116 can host servers 112-114 (which may include web servers). Client 102-104 can communicate with servers 112-114 via network 110 and router 106. A network optimization device, such as application delivery controller 108, may be located in the path from clients 102-104 and servers 112-114, and can help optimize communications between clients 102-104 and servers 112-114. The number and types of devices shown in FIG. 1 are for illustration purposes only and are not intended to limit the scope of this disclosure.

Specifically, some embodiments described below enable application delivery controller 108 (or generally any network optimization device that is located between a client and a server) to substantially reduce the latency at a client, e.g., client 102, for loading a webpage (or generally any resource) served by a server, e.g., server 112.

Predictive Prioritized Server Push of Resources

Figure 2:
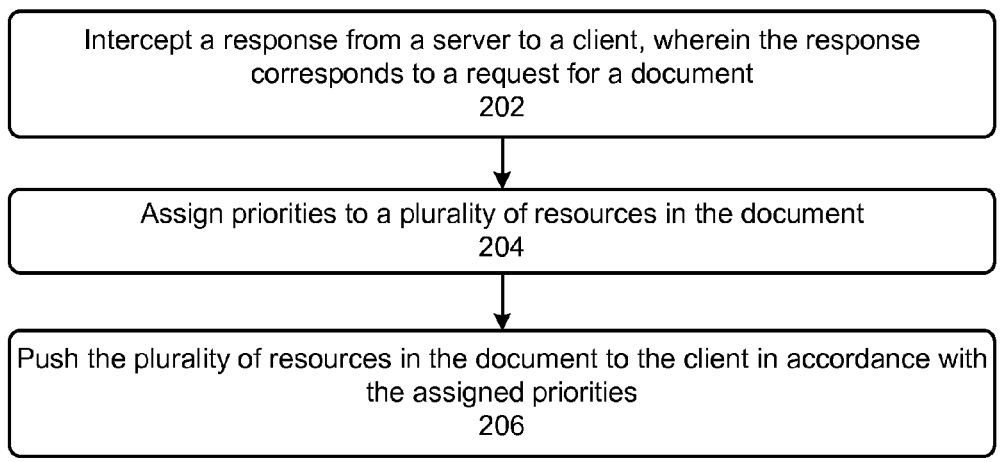
FIG. 2 illustrates a process for performing a predictive prioritized server push of resources in accordance with some embodiments described herein.

FIG. 2 illustrates a process for performing a predictive prioritized server push of resources in accordance with some embodiments described herein. Although some embodiments are described in the context of web technologies, it will be apparent to a person having ordinary skill in the art that the systems and techniques described herein are generally applicable to any client-server model that allows resources to be pushed to the client.

The process illustrated in FIG. 2 can be performed by an intermediary device that is located on a path between a client and a server. The process can begin by intercepting a response from a server to a client, wherein the response corresponds to a request for a document (operation 202). In some embodiments, the client is a web client, the server is a web server, the document is a website, the request is an HTTP request, and the response is an HTTP response.

In general, a document is a representation of information. A document, e.g., a webpage, may include a plurality of one or more types of resources that are arranged or organized in a particular manner. Types of resources include, but are not limited to, HTML, CSS, Javascript (or any other scripting language), multimedia content (e.g., image data), etc.

In some embodiments, the intermediary device can parse the response to determine relationship metadata that specifies how a plurality of resources in the document relate to each other. Specifically, if the document is a webpage, then the intermediary can parse the HTML source code in the document to determine the relationship metadata.

Next, priorities can be assigned to the resources in the document (operation 204). In some embodiments, a priority can be assigned to each resource based on a type of the resource. For example, the following table shows different resources in the first column and the assigned priorities in the second column.

| text/html | 0 (highest priority) |
|---|---|
| text/css | 1 |
| text/javascript | 2 |
| image/* | 3 |

The above example of a table has been provided for illustration purposes only and is not intended to limit the scope of this disclosure. For example, the table can have fewer or more entries that those shown above. Additionally, the table can allow path matching in which a resource name pattern is matched against names of a plurality of resources, e.g., the table can include an entry for "jquery*.js" (wherein "jquey*.js" is a resource name pattern that includes a wild card pattern "*") with an associated priority (and similarly include path matching entries for other JavaScript toolkits) to ensure that JavaScript resources are pushed to the client in a particular order, e.g., to ensure that JavaScript code for a toolkit is pushed to the client before other JavaScript code that uses the toolkit is pushed to the client.

In some embodiments, the intermediary device can store an order in which one or more clients request plurality of resources in the document, and then the system can assign priorities to the plurality of resources based on the stored order. For example, suppose client C1 requests resources in the following order: R2, R5, R3, R1, and R4. The intermediary device can note the order in which the resources were requested, and then store the order. When another client, say C2, requests the document, the intermediary can assign priorities to the resources based on the order in which the resources were requested by the previous client C1. For example, resources that were requested earlier can be assigned a higher priority than resources that were requested later. In the above example, the intermediary device can assign a priority to resource R5 that is higher than the priority assigned to resource R4 because R5 was requested before resource R4.

In some embodiments, the intermediary device can collect data about the order in which the plurality of resources in the document are requested by one or more clients over a plurality of requests. Next, the intermediary device can perform statistical analysis of the collected data, and assign priorities to the plurality of resources based on the statistical analysis. In some embodiments, the intermediary device can assign priorities based on other parameters. For example, different types of client devices (e.g., smartphones, tablets, desktop computers, etc.) may access resources in a different order depending on their capabilities (e.g., screen resolution, bandwidth limitations, etc.). Accordingly, the intermediary device can assign different priorities to the resources based on the type of client device, e.g., the intermediary may have a different resource prioritization table for each type of device). In some embodiments, the statistical analysis may reveal that different types of client devices access resources in a different order. For example, the intermediary device may determine the type of client, e.g., by intercepting the request for the document that the client sent to the server. Next, the intermediary device may perform a separate statistical analysis on the collected data for each type of client, thereby determining different priorities for the resources based on the type of client device.

Once priorities have been assigned, the plurality of resources in the document can be pushed to the client in accordance with the assigned priorities (operation 206). Specifically, pushing a resource to the client can involve sending the resource to the client without first receiving an explicit request for the resource from the client. Some protocols allow a device (e.g., the intermediary device) to "push" resources to the client. Examples of protocols that enable a server or an intermediary device to push content to the client include, but are not limited to, SPDY and HTTP/2.0.

Once the client receives the pushed resources, the client can store the pushed resources on the client's local cache. Subsequently the resource can be presented or otherwise made available to the requesting application (e.g., a web browser that is rendering a webpage) with substantially low latency because the resource is stored in the local cache instead of the resource being fetched from the server or a web cache.

As mentioned above, at least some of the plurality of resources can be stored in the cache of the intermediary device, and the resources can be pushed from the intermediary device to the client. Note that, in these embodiments, the server does not push the resources to the client (in fact, the server may not even implement the "server push" feature). Instead, the intermediary device on its own accord pushes the resources to the client (we are of course assuming that the client implements the "server push" protocol) in accordance with the assigned priorities. If a particular resource is not in the cache of the intermediary device, then the intermediary device can retrieve the resource from the server (or any other location where the resource is available) and then push the resource to the client.

Figure 3:
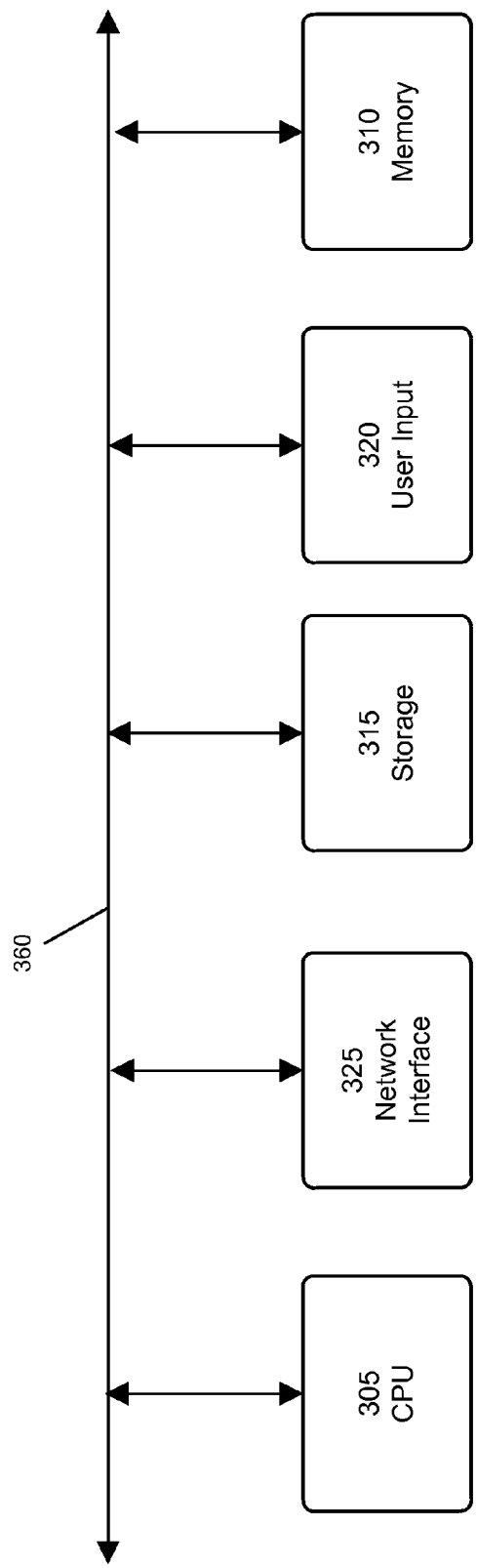
FIG. 3 illustrates an example of a computer system that can be used in conjunction with embodiments described herein.

FIG. 3 illustrates an example of a computer system that can be used in conjunction with embodiments described herein. FIG. 3 is a block diagram of a computer system 300, such as a personal computer, a smartphone, a tablet, or any other client device, suitable for practicing some embodiments described herein. Embodiments of computer system 300 also include intermediary devices such as wireless access points, network switches, hubs, routers, hardware firewalls, WAN/LAN optimizers/accelerators, network attached storage devices, storage array network interfaces, etc.

Computer system 300 includes a central processing unit (CPU) 305 for running software applications and optionally an operating system. CPU 305 may be comprised of one or more processing cores. Memory 310 stores applications and data for use by the CPU 305. Examples of memory 310 include dynamic and static random access memory. Storage 315 provides non-volatile storage for applications and data and may include fixed or removable hard disk drives, flash memory devices, ROM memory, and CD-ROM, DVD-ROM, Blu-ray, or other magnetic, optical, or solid state storage devices.

CPU 305 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 305 or associated processing cores can include virtualization specific hardware, such as additional register sets, memory address manipulation hardware, additional virtualization-specific processor instructions, and virtual machine state maintenance and migration hardware.

Optional user input devices 320 communicate user inputs from one or more users to the computer system 300, examples of which may include keyboards, mice, joysticks, digitizer tablets, touch pads, touch screens, still or video cameras, and/or microphones. In an embodiment, user input devices may be omitted and computer system 300 may present a user interface to a user over a network, for example using a web page or network management protocol and network management software applications.

Computer system 300 includes one or more network interfaces 325 that allow computer system 300 to communicate with other computer systems via an electronic communications network, and may include wired or wireless communication over local area networks and wide area networks such as the Internet. Computer system 300 may support a variety of networking protocols at one or more levels of abstraction. For example, computer system may support networking protocols at one or more layers of the seven layer OSI network model. An embodiment of network interface 325 includes one or more wireless network interfaces adapted to communicate with wireless clients and with other wireless networking devices using radio waves, for example using the 802.11 family of protocols, such as 802.11a, 802.11b, 802.11g, and 802.11n. An embodiment of the computer system 300 may also include one or more wired networking interfaces, such as one or more Ethernet connections to communicate with other networking devices via local or wide-area networks.

The components of computer system 300, including CPU 305, memory 310, data storage 315, user input devices 320, and network interface 325 are connected via one or more data buses 360. Additionally, some or all of the components of computer system 300, including CPU 305, memory 310, data storage 315, user input devices 320, and network interface 325 may be integrated together into one or more integrated circuits or integrated circuit packages. Furthermore, some or all of the components of computer system 300 may be implemented as application specific integrated circuits (ASICs) and/or programmable logic.

Further embodiments can be envisioned to one of ordinary skill in the art. Combinations or sub-combinations of the subject matter disclosed herein can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, ASICs, field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
    an intermediary device intercepting a response from a server to a client, wherein the response corresponds to a request for a document;
    the intermediary device assigning priorities to a plurality of resources in the document based at least on (1) a type of resource, and (2) a resource name pattern that is matched against names of the plurality of resources, wherein the resource name pattern includes a wild card pattern; and
    the intermediary device pushing the plurality of resources in the document to the client in accordance with the assigned priorities.

2. The method of claim 1, wherein the client is a web client, the server is a web server, the document is a page on a website, the request is an HTTP request, and the response is an HTTP response.

3. The method of claim 1, wherein at least some of the plurality of resources are stored in a local cache at the intermediary device.

4. The method of claim 1, further comprising the intermediary device parsing the response to determine relationship metadata that specifies how the plurality of resources in the document relate to each other.

5. The method of claim 4, wherein said parsing comprises parsing HTML source code of the document that is included in the response.

6. The method of claim 1, wherein said pushing comprises sending each resource in the plurality of resources to the client without receiving an explicit request for the resource from the client.

7. A non-transitory computer-readable storage medium storing instructions that, when executed by a computer, causes the computer to perform a method comprising:
    intercepting, by an intermediary device, a response from a server to a client, wherein the response corresponds to a request for a document;
    assigning, by the intermediary device, priorities to a plurality of resources in the document based on at least (1) a type of resource, and (2) a resource name pattern that is matched against names of the plurality of resources, wherein the resource name pattern includes a wild card pattern; and pushing, by the intermediary device, the plurality of resources in the document to the client in accordance with the assigned priorities.

8. The non-transitory computer-readable storage medium of claim 7, wherein the client is a web client, the server is a web server, the document is a page on a website, the request is an HTTP request, and the response is an HTTP response.

9. The non-transitory computer-readable storage medium of claim 7, wherein at least some of the plurality of resources are stored in a local cache at the intermediary device.

10. The non-transitory computer-readable storage medium of claim 7, further comprising the intermediary device parsing the response to determine relationship metadata that specifies how the plurality of resources in the document relate to each other.

11. The non-transitory computer-readable storage medium of claim 10, wherein said parsing comprises parsing HTML source code of the document that is included in the response.

12. The non-transitory computer-readable storage medium of claim 7, wherein said pushing comprises sending each resource in the plurality of resources to the client without receiving an explicit request for the resource from the client.

13. An apparatus, comprising:
a processor; and
a non-transitory computer-readable storage medium storing instructions that, when executed by the processor, causes the apparatus to perform a method comprising:
intercepting a response from a server to a client, wherein the response corresponds to a request for a document;
assigning priorities to a plurality of resources in the document based on at least (1) a type of resource, and (2) a resource name pattern that is matched against names of the plurality of resources, wherein the resource name pattern includes a wild card pattern; and
pushing the plurality of resources in the document to the client in accordance with the assigned priorities.

\* \* \* \* \*